Oct. 21, 1958  J. R. RICHARDS  2,856,606
NAILING MACHINE
Filed June 24, 1955  11 Sheets-Sheet 6
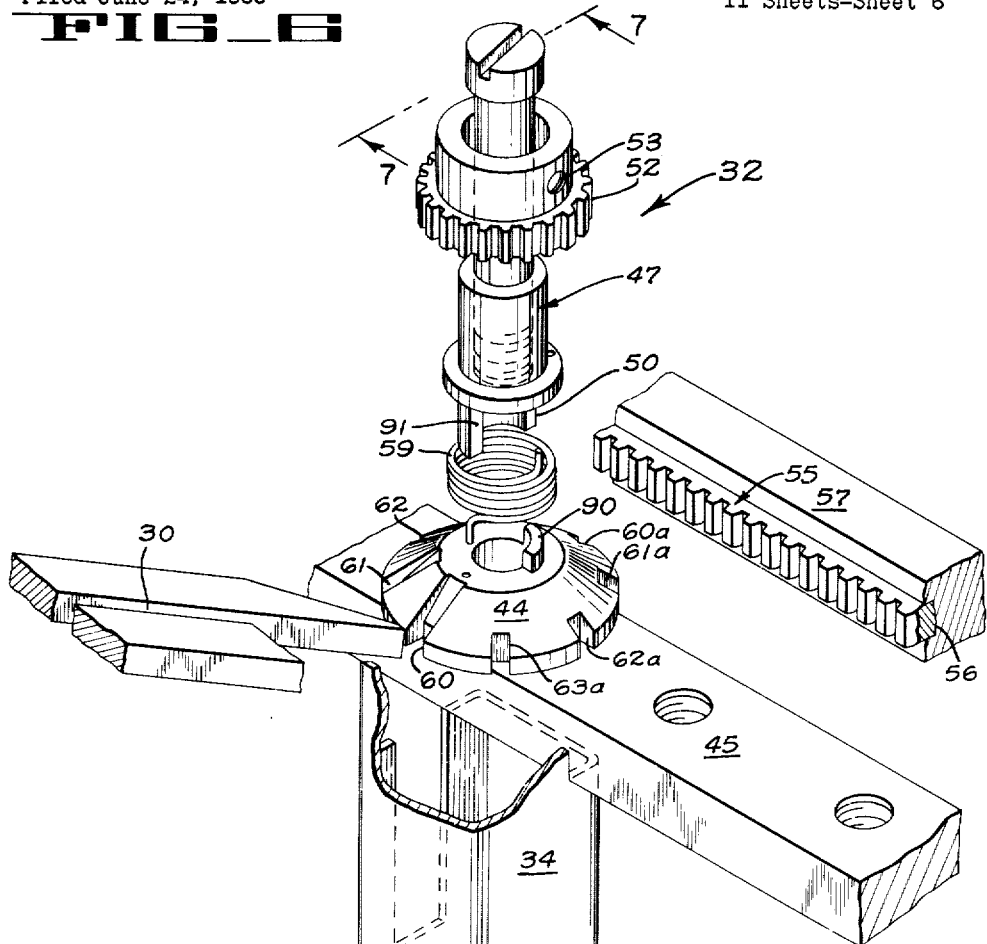
FIG_6
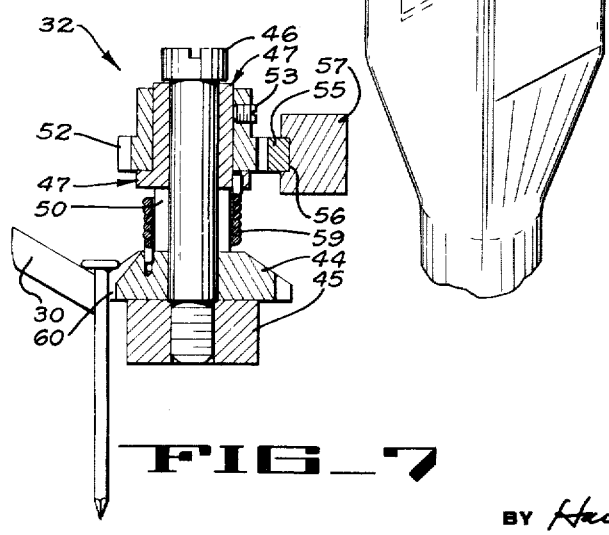
FIG_7
INVENTOR
JOHN R. RICHARDS
BY Hans G. Hoffmeister
ATTORNEY Oct. 21, 1958　　　J. R. RICHARDS　　　2,856,606
NAILING MACHINE
Filed June 24, 1955　　　　　　　　　　　　　　11 Sheets-Sheet 7
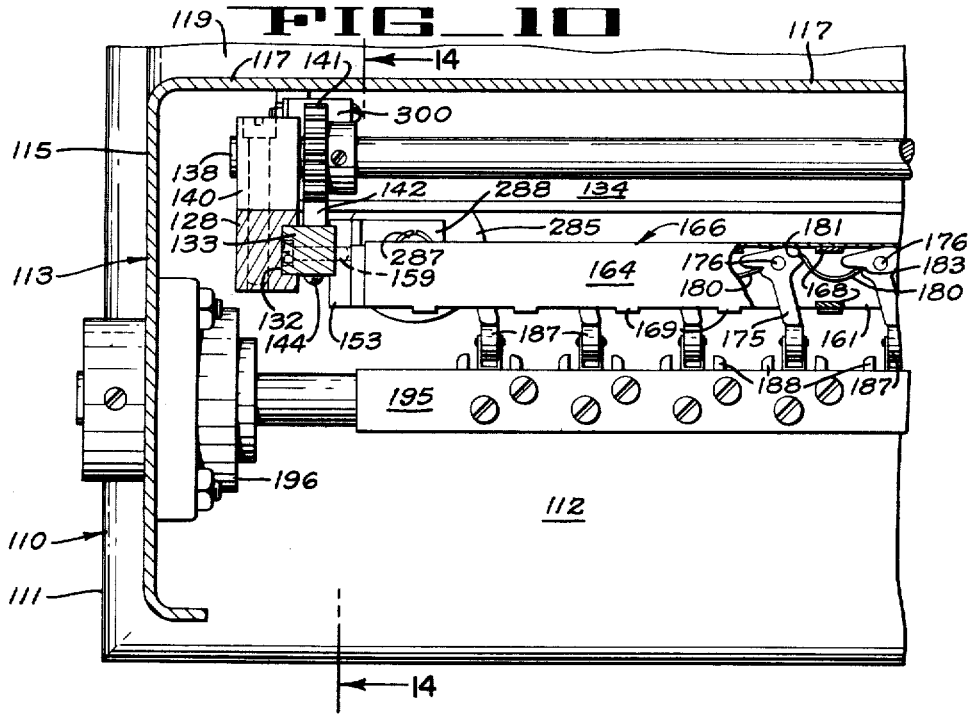
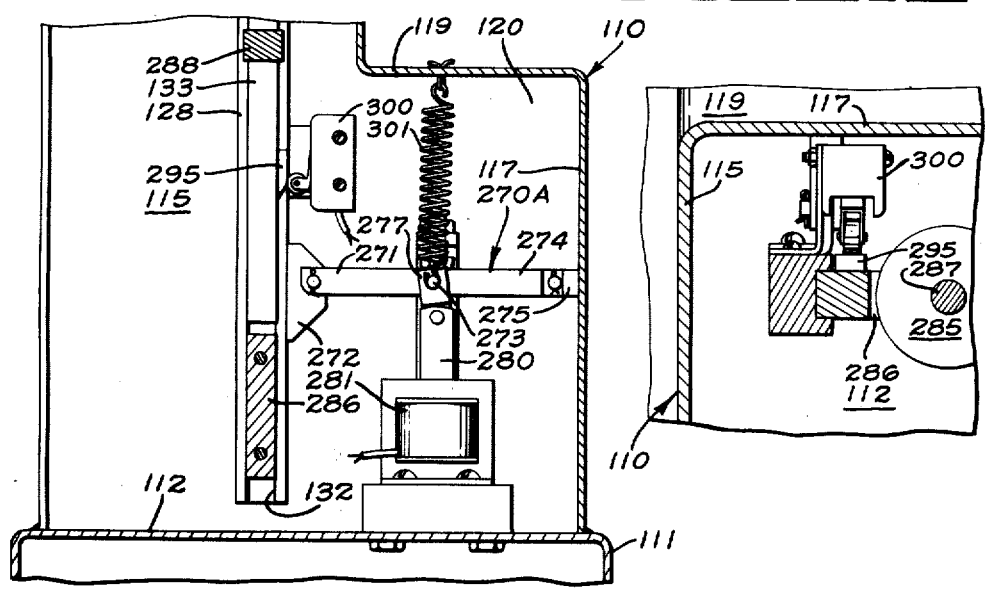
INVENTOR
JOHN R. RICHARDS
BY Hans G. Hoffmeister
ATTORNEY

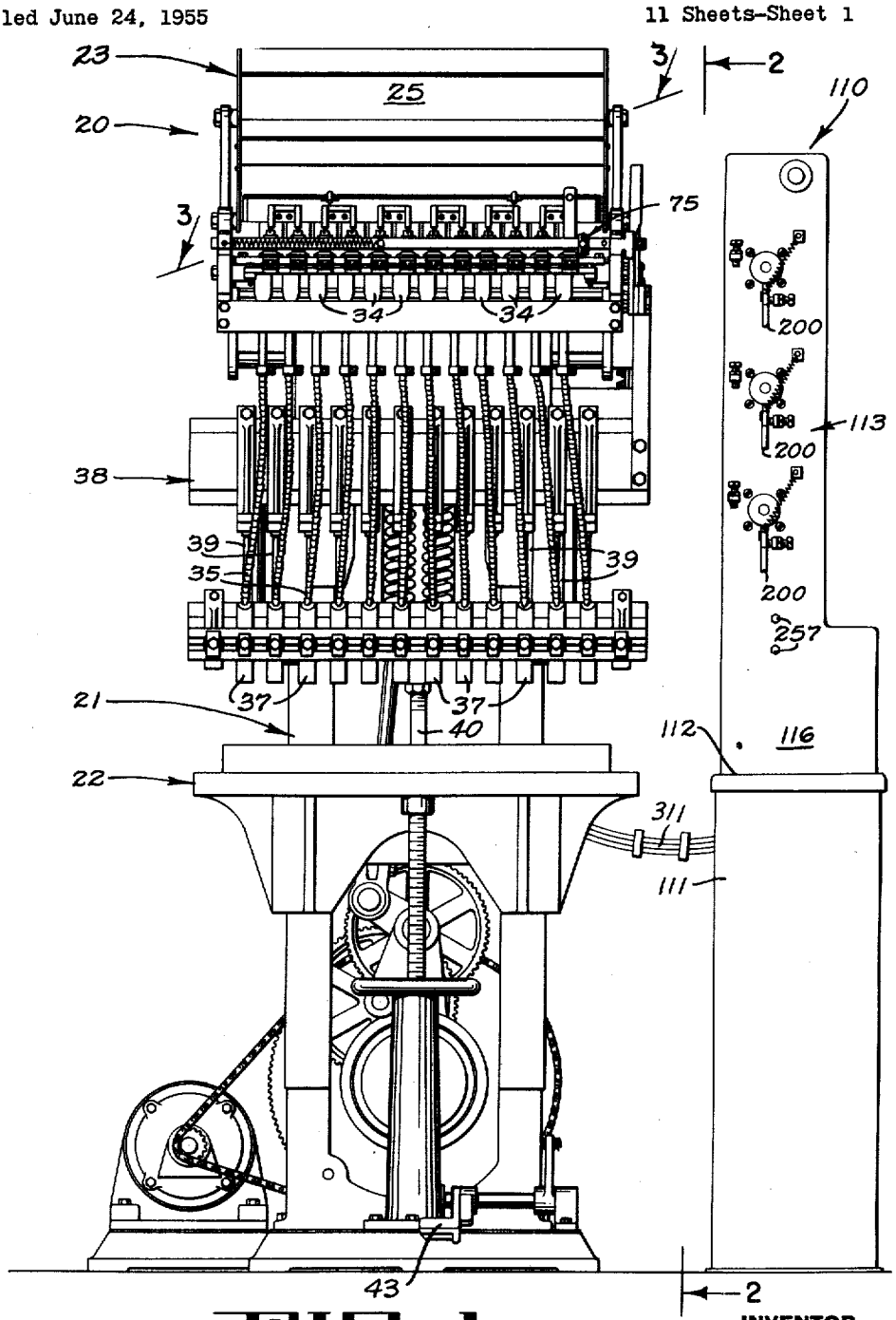

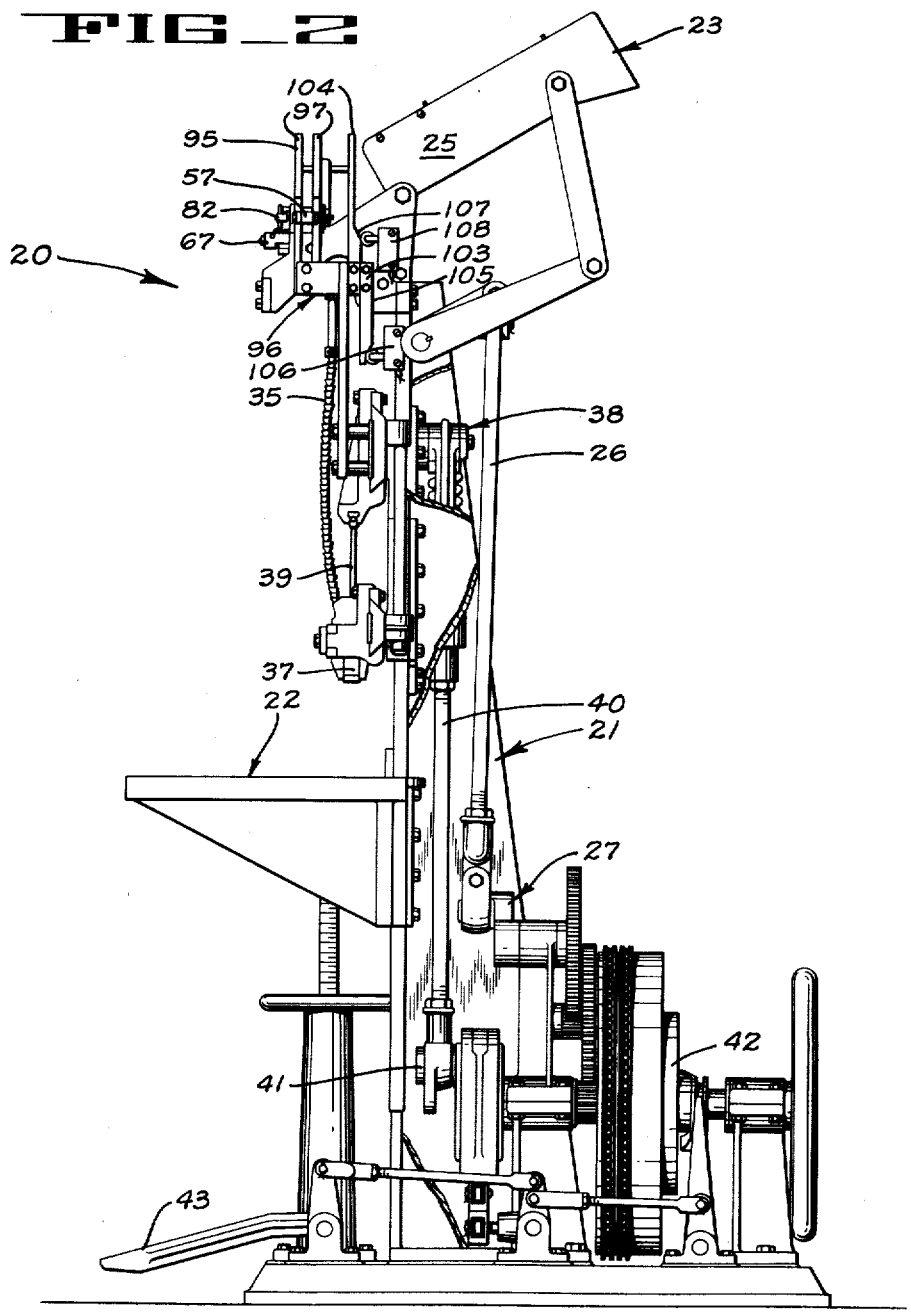

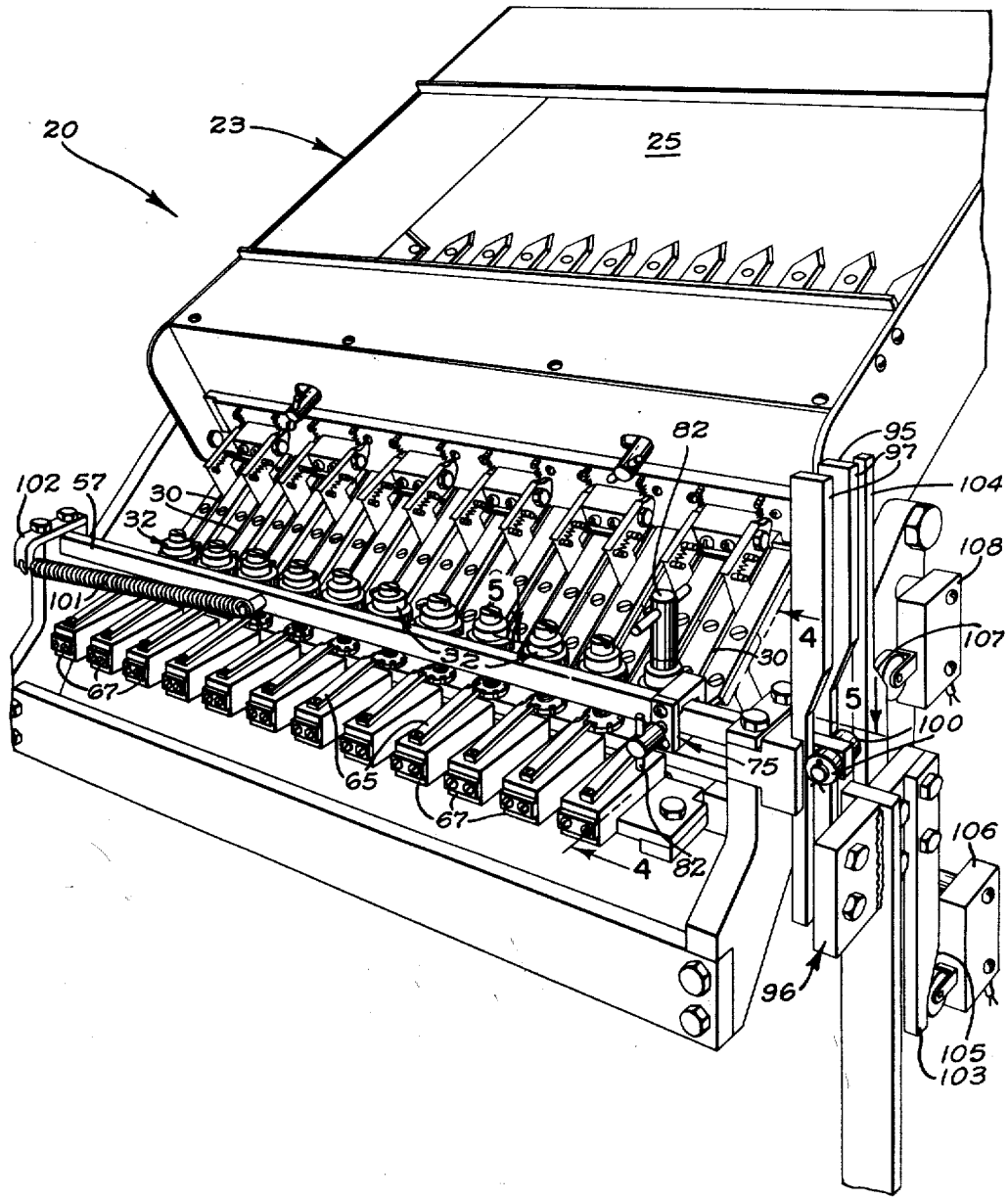

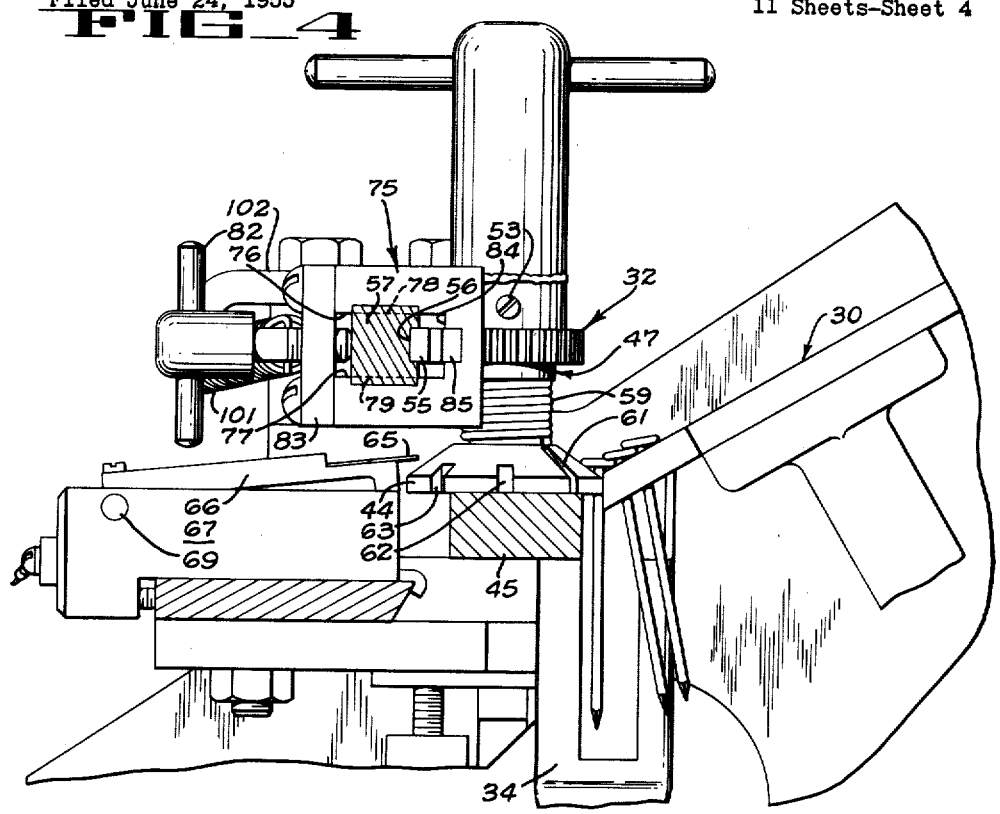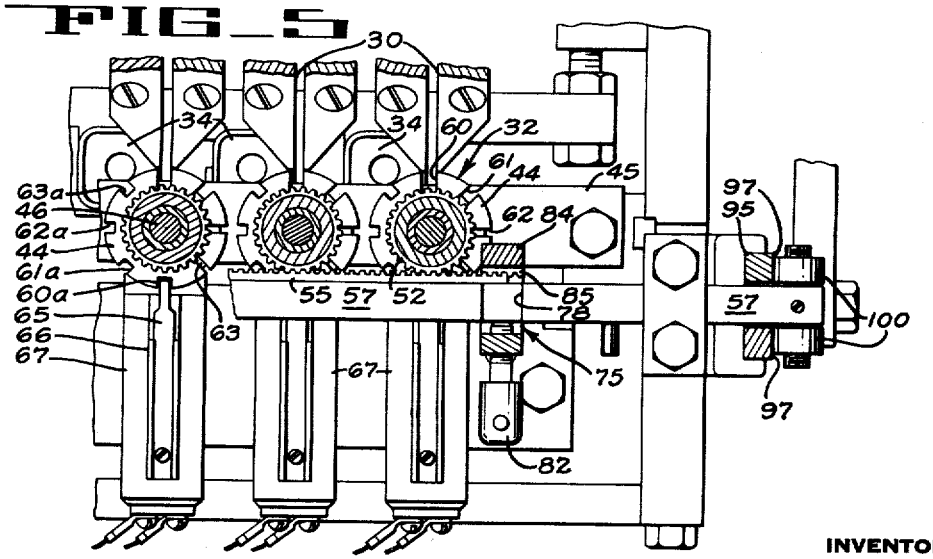

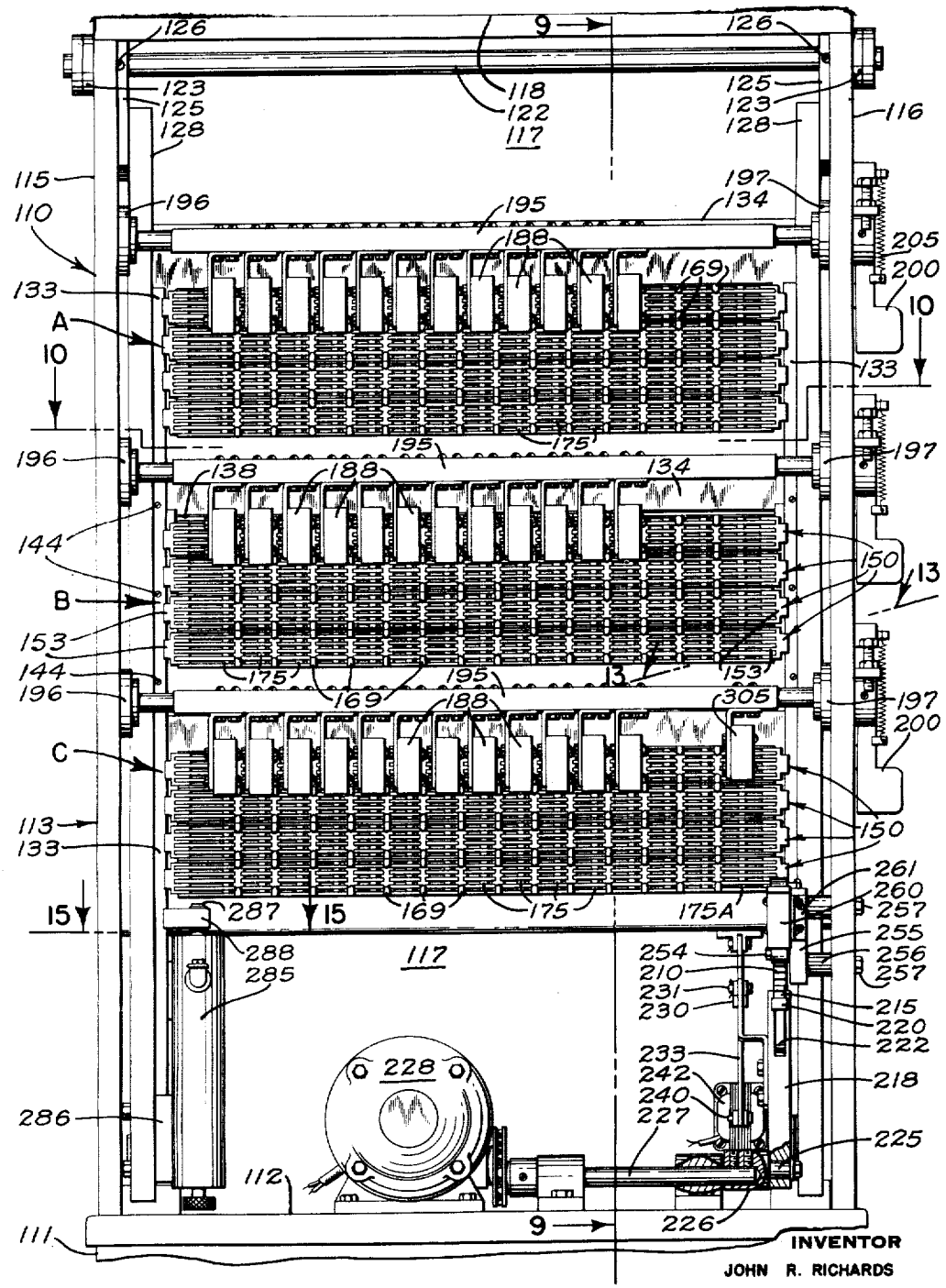

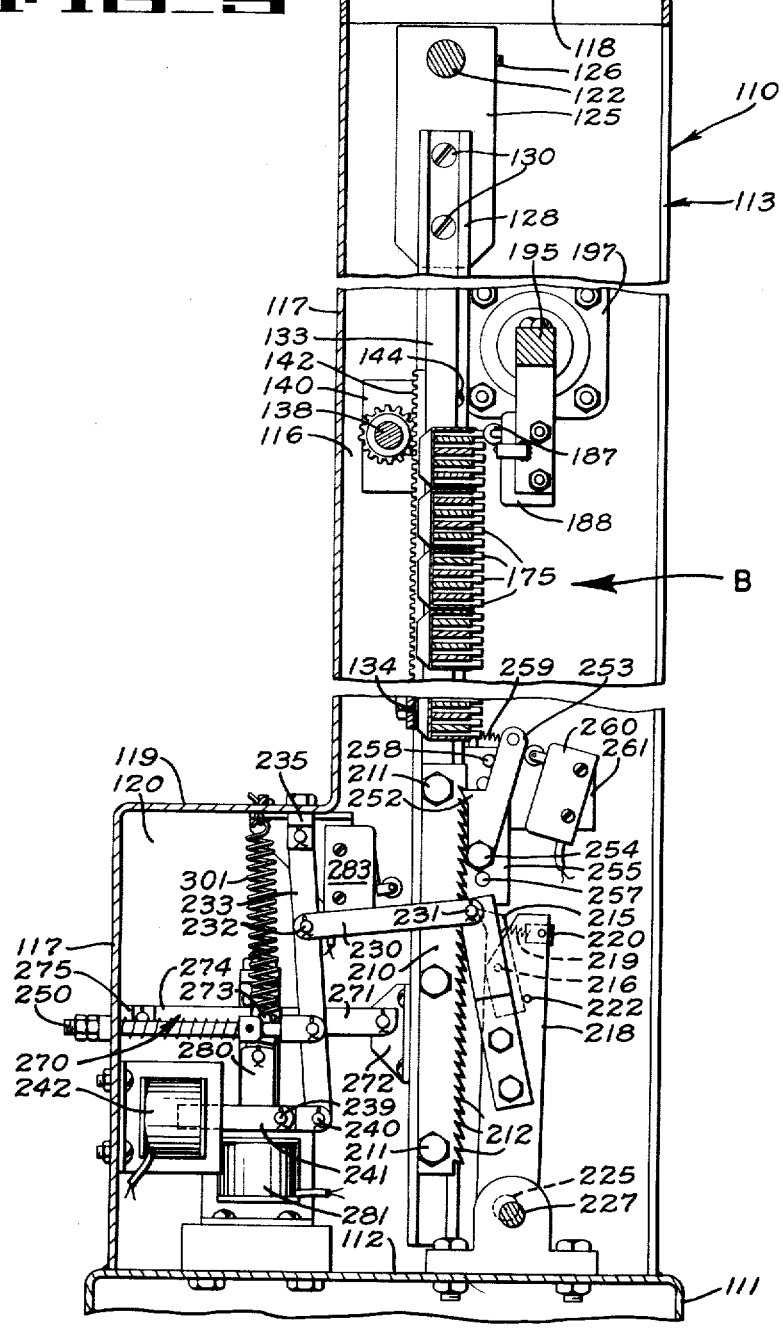

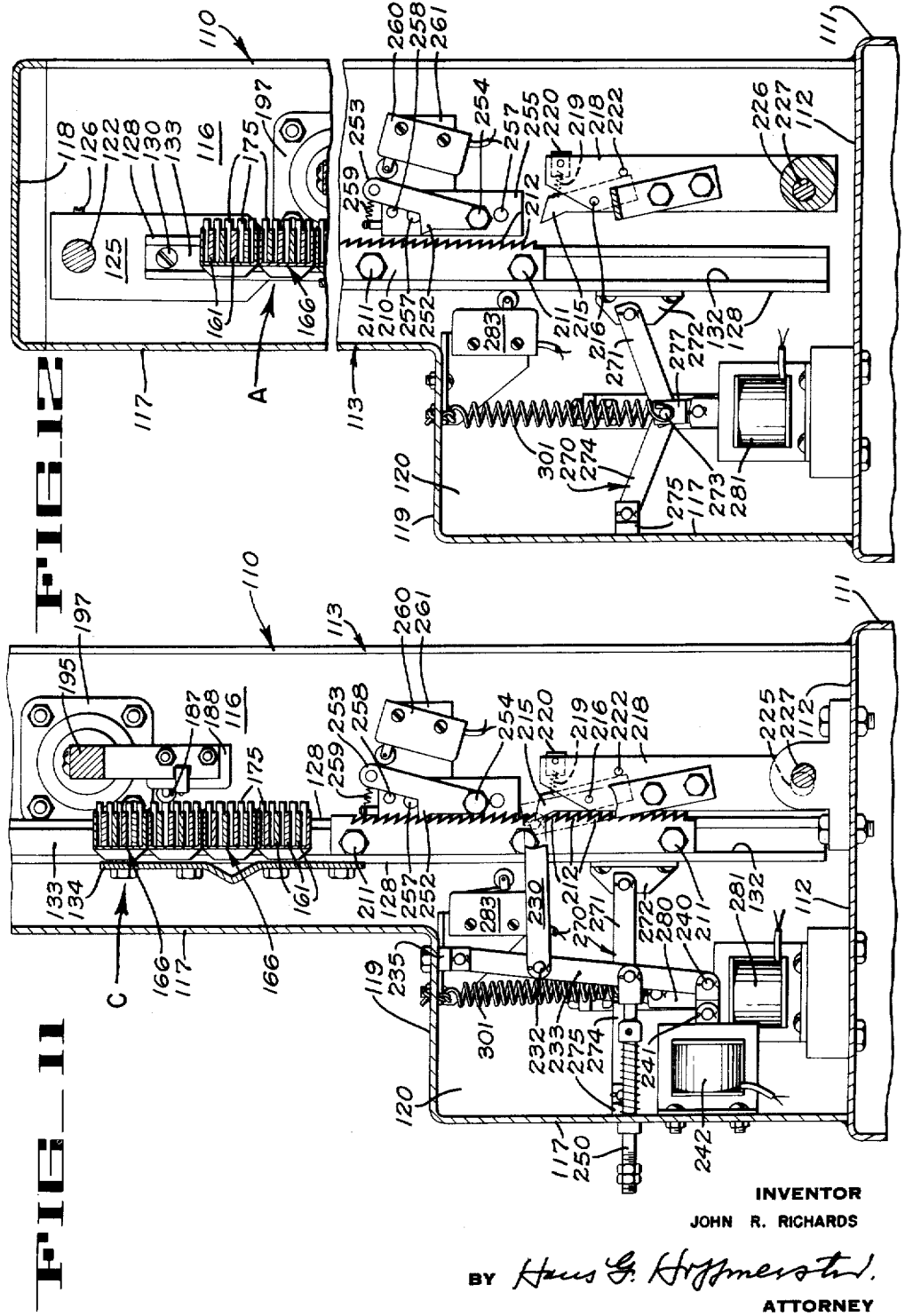

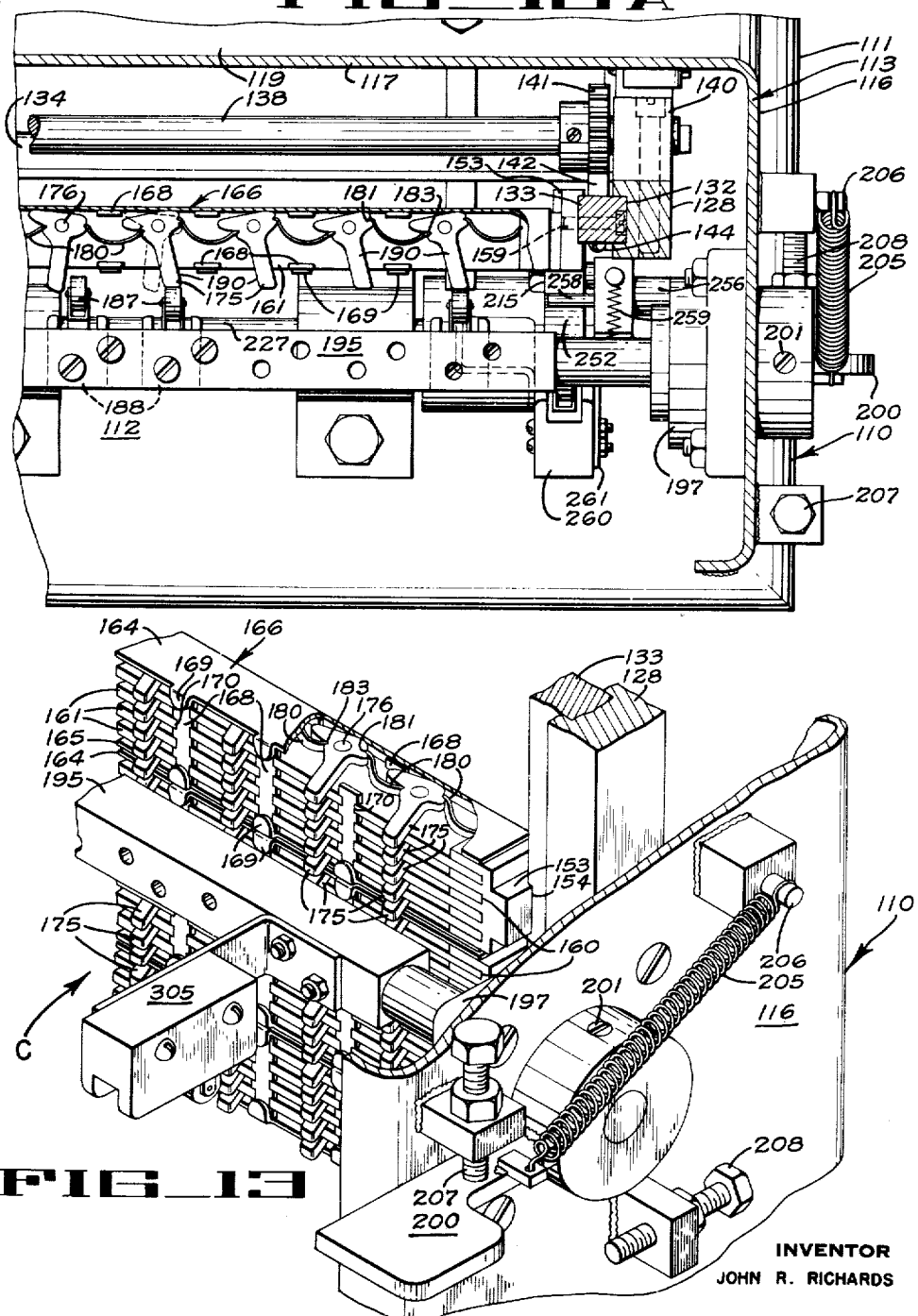

Oct. 21, 1958 J. R. RICHARDS 2,856,606
NAILING MACHINE
Filed June 24, 1955 11 Sheets-Sheet 11
FIG_16
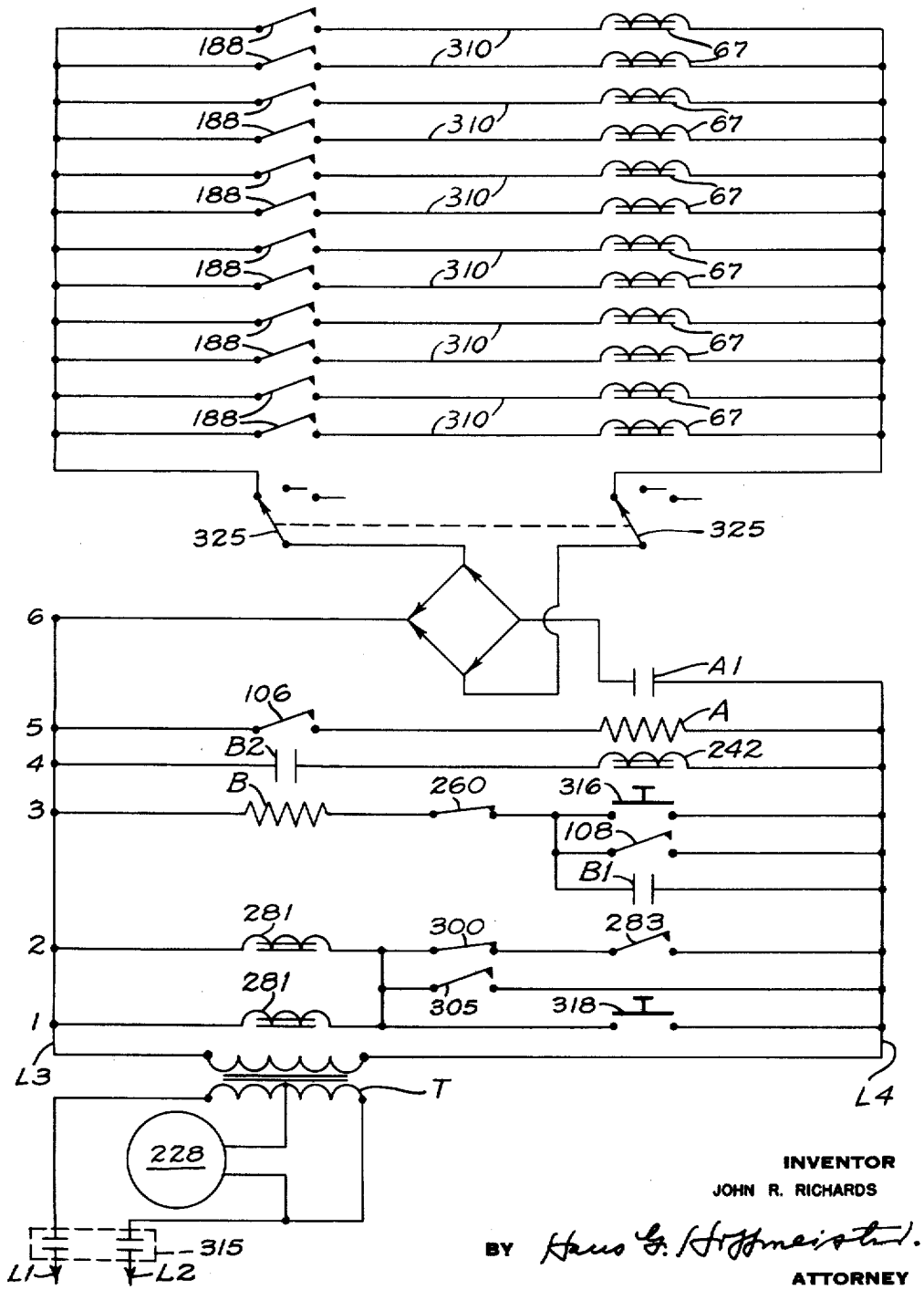
INVENTOR
JOHN R. RICHARDS
BY Hans G. Hoffmeister
ATTORNEY United States Patent Office 2,856,606
Patented Oct. 21, 1958

2,856,606
NAILING MACHINE

John R. Richards, Riverside, Calif., assignor to Food Machinery and Chemical Corporation, San Jose, Calif., a corporation of Delaware Application June 24, 1955, Serial No. 517,729

24 Claims. (Cl. 1—16)

This invention relates to improvements in nailing machines and more particularly pertains to a device for controlling the feeding of nails to the various nailing units of a multiple unit machine.

In multiple unit machines used for driving nails into a work piece, nails may be driven simultaneously from all units during each nailing stroke of the machine to form a uniform pattern in the work piece. However, since a different part of the work piece is contacted during each successive stroke, it is usually necessary that the nail pattern be changed from one stroke to the next. Heretofore, mechanical devices have been used to form the desired pattern in the nail chucks just before the nailing head descends to drive the nails from the chucks. Such mechanical devices are complex in structure and are not flexible in operation. It is therefore an object of the present invention to provide a simple nail feed control mechanism for a nailing machine, said control mechanism being capable of automatically forming successive nail patterns which vary in the number and arrangement of nails according to a selective adjustment made by the operator.

Another object is to provide an efficient electrical control system for a nailing machine.

Another object is to provide an improved nail-pick operating and control mechanism.

Another object is to provide a control mechanism arranged to automatically recycle a nailing machine to repeat a desired series of nailing operations.

Another object is to provide a control apparatus that may be conveniently and easily reset to alter its controlling functions.

Other and further objects of the present invention will become apparent from the following description taken in connection with the accompanying drawings, in which:

Fig. 1 is an elevtaion of a nailing machine installation, particularly showing a side elevation of a control cabinet and its cooperation with the nailing machine proper.

Fig. 2 is a side elevation of the nailing machine of Fig. 1, the view being taken along line 2—2 of Fig. 1.

Fig. 3 is a fragmentary perspective of the nail selecting mechanism used in the machine of Fig. 1, the view being taken in the direction of arrows 3—3 of Fig. 1.

Fig. 4 is a fragmentary vertical section taken on line 4—4 of Fig. 3.

Fig. 5 is a fragmentary horizontal section taken on line 5—5 of Fig. 3.

Fig. 6 is a fragmentary exploded perspective of a nail pick used in the present nailing machine.

Fig. 7 is a vertical section of an assembled nail pick, the view being taken along line 7—7 of Fig. 6.

Fig. 8 is a fragmentary front elevation of the upper portion of the control cabinet of Fig. 1.

Fig. 9 is a fragmentary vertical section taken on line 9—9 of Fig. 8.

Figs. 10-10A is a composite fragmentary horizontal section taken on line 10—10 of Fig. 8.

Figs. 11 and 12 are fragmentary vertical sections, similar to Fig. 9 but showing the mechanism in different operating positions.

Fig. 13 is a fragmentary perspective of the lowermost bank of control pins in the control cabinet, the view being taken in the direction of arrows 13—13 of Fig. 8.

Fig. 14 is a fragmentary vertical section taken on line 14—14 of Fig. 10.

Fig. 15 is a fragmentary horizontal section taken on line 15—15 of Fig. 8.

Fig. 16 is a diagram of the electrical control system used in the machine of Fig. 1.

In Figs. 1 and 2 the reference numeral 20 indicates generally a conventional nailing machine having a rigid frame structure 21 on which a nailing table 22 is adjustably supported. A shaker-type nail feed mechanism 23 is mounted at the upper end of the frame structure 21 and comprises a nail supply hopper 25 which is continuously oscillated in a vertical direction by a rod 26 connected to a power driven crank 27. Nails are directed from the hopper 25 into a plurality of parallel runways 30 (Figs. 3, 5 and 6). A rotary nail pick mechanism 32 (Fig. 6) is disposed at the lower end of each runway and is arranged to remove nails one at a time from the runway and drop them into a funnel 34 (Fig. 6) for delivery through a tube 35 (Fig. 1) to a nail chuck 37 disposed in spaced relation above the nailing table 22. Twelve chucks are illustrated in Fig. 1, but it is evident that the number may be varied by increasing the size of the machine.

The nails are forced out of the chucks and into the work pieces being nailed by a reciprocable nail-driving head 38 which carries a plurality of punches 39 (Fig. 2), each punch being adapted to pass downwardly into one of the chucks to contact the head of the nail therein. The nail-driving head 38 is reciprocated in a vertical direction by a rod 40 connected to a power driven crank 41. The cranks 41 and 27 are connected to a source of power through a clutch 42 that is moved into engagement by a foot pedal 43.

NAIL PICK OPERATING MECHANISM

The several rotary nail pick mechanisms 32 are mounted side-by-side on a line extending transversely of the machine, as seen in Fig. 3. Each nail pick comprises a frusto-conical gate 44 (Figs. 6 and 7) that rests on the top surface of a rigid transverse bar 45 of the frame structure of the machine and is journaled for rotation around an upright bolt 46 that is threaded into the transverse bar 45. A driving hub 47 is disposed immediately above the gate 44, having a semi-cylindrical depending skirt portion 50 whose lower end surface is in sliding contact with the top surface of the gate. A gear 52 is positioned around the driving hub 47 and is secured thereto by a setscrew 53. The gear 52 is arranged to be rotated by a rack 55 which is adjustably secured (in a manner to be described presently) in a slot 56 of a sliding, gear-actuating bar 57. Rotary movement of the gear 52 is transmitted to the gate 44 through a torsion spring 59 that has end portions anchored in holes in both members.

The gate 44 has four generally vertical nail-receiving slots 60, 61, 62 and 63 (Fig. 5) cut in its periphery, and each nail receiving slot 60, 61, 62 and 63 has a corresponding slot 60a, 61a, 62a and 63a, respectively, disposed diametrically opposite to it and adapted to receive the end of a stop bar 65 carried on the top surface of a control member 66 of a gate locking solenoid 67. As seen in Fig. 4, the member 66 is mounted in the solenoid housing for pivoting on a pin 69 and, when the solenoid is energized, the control member is pulled down into the housing, moving the stop bar 65 into whichever slot 60a, 61a, 62a or 63a that is aligned therewith. When the bar 65 is disposed in one of the slots, the nail pick gate 44 cannot be rotated to carry a nail from the associated runway 30 to the funnel 34 even though the gear 52 is rotated by the rack 55. The torsion spring 59 permits the gear to rotate while the gate is held against rotation. It will be apparent that the nail pattern may be changed by locking certain gates by means of the associated solenoids while permitting the other gates to pick nails from the runways and drop them into the funnels leading to the chucks. For example, if the desired nail pattern requires nails to be driven out of chucks 1, 3, 5, 7, 9, and 11, the solenoids associated with the nail picks, that feed chucks 2, 4, 6, 8, 10 and 12, would be energized to lock the nail picks, while the nail picks feeding chucks 1, 3, 5, 7, 9 and 11 are actuated by the rack 55 to feed nails to these chucks. Then, on the next nail-driving stroke of the nailing head, the desired nail pattern will be driven into the work piece.

The nail-receiving slots 60, 61, 62 and 63 (Fig. 5) are of different widths and each slot is adapted to receive a nail of a particular size. When a change from nails of one size to nails of another size is desired, all the gates 44 are rotated about the bolt 46 to bring the slots corresponding to the new size of nail into alignment with the runways. Before the gates 44 can be rotated, the rack 55 must be unclamped from the actuating bar 57 to which it is secured by a square clamp 75 (Fig. 4). The clamp has an upper wall 76 and a lower wall 77 disposed in grooves 78 and 79, respectively, formed transversely in the actuating bar 57. A screw 82, that is threaded through a front wall 83 of the clamp, bears against the actuating bar 57 and pulls the rear wall 84 toward the actuating rod to bring a rack segment 85, that is rigidly secured to the rear wall 84, into meshing engagement with the rack 55. Thus, when the screw 82 is threaded into the clamp, the rack 55 is clamped in the groove 56 of the actuating bar 57. To release the rack 55, the screw is backed out of the front wall 83 and the whole clamp is shifted toward the right (Fig. 4) to disengage the rack 55 from the rack segment 85. When the rack 55 is free of the segment 85, the rack may be slid along the groove 56 of the actuating bar 57 to simultaneously rotate all the gates 44 until the desired nail-receiving slots are in alignment with the nail runways 30. To make certain that each gate 44 is indexed the same number of degrees that the gear 52 (Fig. 6) is indexed by the rack 55, the torsion spring 59 is designed so that a stop block 90, formed on the top surface of each gate 44, is forced into abutting contact with one face 91 of the semi-cylindrical skirt 50 of the hub 47 to define the final indexed position of the gate.

As mentioned above, nails are picked from the runways 30 by the nail picks 32 and delivered to the funnels 34 when the actuating bar 57 is moved in a direction transversely of the machine, as from left to right in Fig. 3. When the bar 57 is returned from right to left, the nail-receiving slots are returned to positions aligned with the runways. The bar 57 is moved toward the right (Fig. 3), during the nail-picking operation by a cam 95 that is secured to a structural member 96 carried by the nail-driving head 38. The cam 95 has two spaced, identical camming surfaces 97 that engage rollers 100 rotatably mounted on the end of the rack-actuating bar 57. When the nail-driving head 38 moves downwardly during a nail-driving operation, the bar 57 is shifted toward the right to actuate all of the rotary gates that are not locked in place by their solenoids. The actuation of the nail picks 32 by the bar 57 is so timed with the movement of the nail-driving head that the nailing punches 39 move into the chucks 37 before the selected nails reach the chuck. Thus, the nails selected by the nail picks 32 during one nail-driving stroke of the head 38 are not used during that stroke but come to rest in the chucks ready to drop into position as soon as the punches 39 are lifted out of the chucks and are then in position to be driven during the next nailing stroke.

Movement of the bar 57 toward the right in the nail-picking operation is carried out against the resistance of a spring 101 that is connected between the bar 57 and a frame member 102. When the nail-driving head 38 is moved upwardly, the camming surfaces 97 release the rollers 100 and the spring 101 returns the bar 57 toward the left (Fig. 3) to realign the nail-receiving slots with the nail runways.

A pair of cams 103 and 104 (Fig. 2) are mounted by cap-screws to the side face of the structural member 96 carried by the nail-driving head 38. The cam 103 has a camming surface 105 arranged to contact and close a normally open switch 106 when the nailing head has covered approximately one-fifth of its downward nail-driving stroke. When the nailing head has completed about four-fifths of its upward return stroke, the cam permits the switch 106 to open. The cam 104 has a camming surface 107 arranged to close a normally open switch 108 when the nailing head reaches the top of its stroke.

NAIL PICK CONTROL MECHANISM

The nailing machine of the present invention is arranged to make a plurality of consecutive nailing strokes, each stroke being effective to drive a predetermined pattern of nails into a wooden object that is being assembled. Each nail pattern may be identical to a previous pattern or it may be entirely different. As previously mentioned, the nail pattern that is driven during a particular stroke is dependent upon which chucks received nails during the previous working stroke, and the filling of the chucks is controlled by the selective locking of the nail picks through the energization of the associated gate-locking solenoids 67. A control mechanism is employed in connection with the present machine whereby the nail patterns for sixty consecutive nailing strokes may be pre-set so that, during each nailing stroke, the nail pattern for the next stroke will be automatically formed in the nailing chucks. This control mechanism is mounted in a control cabinet 110 (Fig. 1) which may be positioned close to the nailing machine 20 and within easy reach of the machine operator.

The control cabinet 110 has a rigid base portion 111 on which a horizontal table top 112 is mounted. An upper portion 113 of the cabinet houses the control mechanism and, as seen in Fig. 8, the front of the cabinet may be open. If desired, a door may be pivotally mounted on the front of the cabinet. The upper portion 113 of the cabinet has side walls 115 and 116, a back wall 117, an upper top wall 118, and a lower top wall 119 (Fig. 9) formed over a recessed portion 120 of the cabinet. A bar 122 extends across the upper end of the cabinet and is rotatably journaled in bearings 123 (Fig. 8) in the side walls 115 and 116. A pair of hanger straps 125 is secured by setscrews 126 to the bar 122 at spaced points, one hanger strap being disposed closely adjacent each side wall, and an elongated gib 128 is secured in depending relation on each hanger strap 125 by capscrews 130 (Fig. 9). The gibs 128 have inwardly directed guide grooves 132 (Figs. 10 and 10A) each of which receives a rail 133 in sliding engagement. The gibs are interconnected for unitary swinging movement by plates 134 (Figs. 8 and 11) that extend across the back of the cabinet and are secured to each of the gibs. Unitary movement of the two rails 133 is brought about by a rod 138 (Figs. 10 and 10A) that is rotatably journalled at each end in a bearing 140 that is secured to one of the gibs 128. Near each end the rod 138 carries a gear 141 that meshes with a rack 142 which is secured by capscrews 144 to each of the sliding rails 133. This rack and gear mechanism causes each sliding movement of one of the rails 133 to immediately be transmitted to the other rail.

In Fig. 8, three banks of control pins A, B and C are mounted in the cabinet 113. Since all the banks are substantially identical, a description of the middle bank B will be sufficient to disclose the structure of all three banks. The bank B comprises four identical control pin units or assemblies 150 mounted in superimposed relation between the sliding rails 133. Each pin assembly includes two oppositely disposed end members 153 which are secured in grooves 154 (Fig. 13) in the rails 133 by capscrews 159 (Fig. 10A). Each end member 153 having four inwardly directed grooves 160 (Fig. 13) adapted to receive the ends of four support plates 161 which extend between the end members 153. The plates 161 are held in spaced relation to each other and to upper and lower flanges 164 and 165 of a U-shaped housing 166 by a plurality of front and rear spacer strips 168, that are locked by overlapping tabs 169 of the housing 166 in grooves 170, provided on the front and rear edges of the plates 161. The spacer strips 168 divide the unit into a plurality of transversely spaced compartments, in each of which five vertically aligned control pins 175 are pivotally mounted on a rod 176 that is journalled in the superposed support plates 161. It will now be evident that each control pin is mounted in a vertical line of pins and in a transverse line of pins. Adjacent pins in a transverse line are interconnected by a flat spring 180 which is disposed at one end in a notch 181 (Fig. 10A) in the body portion of one pin 175 and is disposed, at the other end, in a notch 183 in the adjacent pin. In this manner each pin 175 is pivotable from a position in alignment with a roller actuator 187 of a switch 188, as shown in full lines 190 in Fig. 10A, to the dotted line position wherein it is out of alignment with the switch actuator. The switches 188 are mounted on a bar 195 (Figs. 10A and 13) that extends across the cabinet and is pivotally mounted at its ends in the side walls in bearing blocks 196 and 197. The switches 188 are spaced on the bar 195 to conform with the spacing of the control pins 175 so that there is a switch associated with each pin. Each switch 188 is normally open and is connected in a circuit that controls one of the solenoids that are effective to lock the nail picks. As will be explained more fully hereinafter, the banks of control pins are mounted for indexing in a vertical direction so that, after each nailing stroke of the machine, all of the banks A, B and C are shifted upwardly a distance sufficient to move one transverse line of control pins upwardly out of the horizontal plane of the switch actuators 187 and bring the transverse line next below into the horizontal plane of the switch actuators. Accordingly, as soon as the banks are indexed upwardly each control pin 175 that has been pre-set to the full line position of Fig. 10A will immediately contact the associated switch actuator 187 and close the switch 188. Each nail pick-locking solenoid 67 (Fig. 4) is connected in a circuit in series with one of the switches 188. Therefore, if the control pin 175, associated with a particular nail pick, is pre-set to switch-closing position, the switch 188 will be closed when the bank is indexed, and the solenoid 67 will be energized as soon as power is supplied to the circuit. It will now be evident that to pre-set the machine to automatically form consecutive patterns of nails, it is only necessary to pre-set the control pins in each transverse line either to effective, switch-actuating position or to the ineffective position wherein the associated switch is not contacted by the pin.

In Fig. 8, each bank A, B, and C has four units 150. In each unit the control pins 175 are mounted in transverse lines of 15 pins and vertical lines of 5 pins. Twelve switches 188 are mounted on the bar 195, each switch being in alignment with a vertical line of control pins. With this arrangement, a maximum of twelve nails can be driven by each nailing stroke of the machine. Any desired pattern can be obtained for any particular stroke merely by pre-setting the control pins in the corresponding transverse line of pins to effective or ineffective position. For example, if a pattern requiring nails to be driven only from the chucks at each end of the line of chucks, the control pins 175, associated with all of the other chucks in between the end chucks, will be moved to switch-contacting positions whereby to energize the associated solenoids which prevent the nail picks from dropping nails into the in-between chucks. In order that the operator can have ready access to all the control pins for pre-setting the pins, a lever 200 (Fig. 13) is secured to the switch-mounting bar 195, adjacent the side wall 116, by a setscrew 201. When the lever 200 is swung clockwise, the switches on the bar are swung to a position projecting away from the banks of pins. A spring 205, connected between a pin 206 on the side wall 116 and the lever 200, holds the lever against an adjustable stop screw 207 to define this outwardly projecting position of the switches. When the lever 200 is swung counterclockwise, the spring 205 holds the lever 200 against a second adjustable stop screw 208.

The banks of control pins are indexed upwardly during operation of the nailing machine by shifting the slidable side rails 133 upwardly. As previously explained, the end members 153 of the control pin units 150 are secured by capscrews to the rails 133, and the rails 133 are joined together for unitary vertical movement by the rack and pinion mechanism (Figs. 10 and 10A). A ratchet bar 210 (Fig. 9) is secured by capscrews 211 to the lower end of one of the slidable bars 133. Teeth 212 on the bar 210 are arranged to receive the pointed end of a pawl 215 that is pivotally mounted on a pin 216 in the upper forked end of an actuating lever 218. A compression spring 219 which is anchored between the pawl 215 and a bracket 220, mounted on the rear face of the forked end of the lever 218, tends to pivot the pawl 215 in a counterclockwise direction about pin 216 and into engagement with the ratchet teeth. A pin 222 which spans the forked end of the lever 218 limits the counterclockwise pivoting movement of the pawl 215. The lever 218 is mounted for reciprocation in a substantially vertical direction on a crankpin 225 (Fig. 8) that is formed on an enlarged hub 226 which is secured eccentrically on a shaft 227. During the operation of the nailing machine, the shaft 227 is continuously rotated by a motor 228 that is mounted on the table top 112 of the control cabinet.

The actuating lever 218 is guided in its reciprocating movement by a link 230 (Fig. 9) that is pivotally connected by a pin 231 to the lever 218 and by a pin 232 to a lever 233 that is pivotally mounted on a bracket 235 secured to the underside of the upper wall 119 of the cabinet. At its lower end, the lever 233 is pivotally connected through pins 239 and 240 to the plunger 241 of a solenoid 242 that is mounted on the inner side of the back wall of the cabinet. When the solenoid 242 is energized, the plunger 241 is drawn into the solenoid housing and the lever 233 is pivoted clockwise on the bracket 235 to swing the actuating lever 218 counterclockwise about the crankpin 225, moving the pawl 215 into engagement with the ratchet teeth. When the solenoid 242 is de-energized, a spring-loaded push rod 250, which is slidably mounted in the rear wall of the cabinet and is pivotally connected to the lever 233, swings the lever 233 counterclockwise to move the pawl 215 out of engagement with the ratchet teeth.

It should be noted that if the actuating lever 218 is moved upwardly by the crankpin 225 while the solenoid 242 is energized and the pawl 215 is in engagement with the ratchet teeth, the sliding rails 133 will be moved upwardly. The eccentricity of the crankpin 225 is such that the amount that the rails are raised corresponds to the distance necessary to move one transverse line of control pins 175 out of engagement with the associated switch actuators 187 and move the transverse line of pins next below into engagement with the switch actuators.

In its upward movement, the ratchet bar 210 contacts a holding tooth or latch 252 formed on a lever 253 that is pivotally mounted by a bolt 254 to a block 255 which is secured to the side wall 116 by spacers 256 and bolts 257. As the ratchet bar 210 ascends, it pivots the lever 253 in a clockwise direction away from a stop pin 258 and against the resistance of a spring 259 which returns the tooth 252 to position under the tooth next below. When the lever 253 is swung clockwise, it contacts and and opens a normally closed switch 260, that is mounted in fixed position on a bracket 261 secured to the block 255. When the switch 260 is opened, the solenoid 242 will be de-energized and the pawl 215 will be moved out of engagement with the ratchet. The ratchet bar 210 and the rails 133 will be retained in their upper indexed position by the holding tooth 252. Thus, each time the solenoid 242 is energized the banks of control pins 175 will be indexed upwardly to a locked position wherein a new transverse line of pins is in engagement with the switch actuators 187.

When the desired number of nailing patterns have been driven by the nailing machine, the banks A, B and C may be lowered by pivoting the entire control unit, including the gibs 128, the sliding rails 133, and the banks of pins mounted on the rails, in a clockwise direction about rod 122 (Fig. 9). This swinging movement will move control pins 175 away from the switch actuators and will move the ratchet teeth away from the holding tooth 252. The entire unit is swung in the clockwise direction by means of a pair of identical linkages 270 and 270A (Figs. 12 and 14, respectively), each linkage being disposed directly behind one of the gibs 128 in the recessed portion 120 of the cabinet. Each linkage 270 and 270A includes a lever 271 pivotally connected to a bracket 272 secured to a gib 128 and to a pin 273, a link 274 pivotally connected to a bracket 275 on the rear wall of the cabinet and to the pin 273, and a link 277 pivotally connected to the pin 273 and to the plunger 280 of a solenoid 281 mounted on the table top 112. When the solenoids 281 are energized, the plungers 280 are drawn downwardly into the solenoid housings causing the gibs 128 to be swung clockwise, releasing the ratchet and permitting the sliding rails to slide downwardly. During the clockwise pivoting movement of the gibs, one of the gibs contacts and closes a normally open switch 283 suspended from the lower top wall 119 of the cabinet. Closing of the switch 283 energizes a holding circuit to keep the solenoids energized. The speed of descent of the rails 133 and the control units thereon is controlled by a dashpot 285 (Fig. 8), which is mounted at its lower end to one of the gibs 128 by a bracket 286 and has a piston rod 287 connected by a rigid arm 288 to one of the sliding rails. As the unit reaches its lowermost position, a cam 295 (Fig. 14) contacts and opens a normally closed switch 300 to de-energize the solenoids 281 and permits a spring 301 which is connected between the lower top wall 119 and each pin 273 to swing each linkage 270 and 270A upwardly, thereby swinging the ratchet bar counterclockwise (Fig 12) until the ratchet teeth engage the holding tooth 252.

A normally open recycling switch 305 is mounted on the lowermost switch-support bar 195 (Fig. 8) adjacent the right end thereof and in position to be actuated by any control pin 175 of the associated vertical row of pins that has been moved to switch-contacting position. The recycling switch 305 is connected in a circuit in series with the solenoids 281 so that, when the switch 305 is closed, the solenoids are energized to swing the control unit away from the holding tooth to permit the unit to slide downwardly. Accordingly, if the operator wants the unit to be recycled after any particular transverse line of pins has actuated the switches 188, he must move the control pin 175 at the righthand end (Fig. 8) of that particular transverse line into effective position. For example, if the machine is to be recycled when the lowermost transverse line of bank C has actuated the nail pick solenoids, the control pin 175A would be moved to effective position.

Operation

The operation of the nailing machine will be described with reference to an electric control diagram shown in Fig. 16. In this diagram the lines L1 and L2 represent leads connected to a source of A. C. electrical power. A transformer T has its primary winding connected across the lines L1 and L2 and its secondary connected to supply lines L3 and L4 of the principle control circuit. Secondary circuits are indicated by reference numerals 1 through 6. Assume that the banks of control pins in the cabinet 113 are in their lowered position; that a nailing operation is to be performed that requires twenty consecutive nailing patterns; and that the same nailing operation is to be repeated over and over. The lower bank C (Fig. 8) is particularly adapted for such an operation since it has twenty transverse lines of pins and since the recycling switch 305 is suitably positioned to contact the recycling control pin 175A at the end of each operation to cause the operation to be repeated.

At the beginning of a new nailing operation all of the chucks 37 of the machine are empty. Therefore, to start the operation, nails can be inserted manually in the chucks to form the nail pattern to be formed during the first nailing stroke. The first nail pattern can also be formed in the chucks by maneuvering the bank C in a manner which will be explained after the operation of the controls has been explained. The operator then pivots the lowermost lever 200 (Fig. 13) on the side of the cabinet to rotate the bar 195 and move the switches 188, associated with the bank C, away from the control pins 175. The control pins in the various transverse lines are preset to "effective" or "ineffective" position, the pins in the first or uppermost transverse line being arranged to select the desired pattern for the second nailing stroke, the second line being arranged to select the desired pattern for the third nailing stroke, and so on. The lowermost line will, of course, be arranged to select the pattern desired for the first nailing stroke of the next nailing cycle. The switch-mounting bar is then swung back to its original position, moving the switch actuators 187 into contact with all of the control pins in the uppermost transverse line that have been preset to effective position. Accordingly, the corresponding switches 188 will be closed immediately. It will be noted in Fig. 16 that each switch 188 is connected to an individual nail pick solenoid 67 by a conductor 310. In Fig. 1, the several conductors 310 are illustrated as forming a cable 311 extending from the control cabinet 110 to the nailing machine 20.

To start a nailing cycle, the operator closes switch 315 in supply lines L1 and L2 to energize the motor 228 which continuously rotates the eccentric mechanism that periodically lifts the slide indexing linkage. The operator then depresses the foot pedal 43 (Fig. 2) to engage the clutch 42 and cause the nail supply hopper 25 to be oscillated and the nailing head 38 to move downward. When the head 38 has covered approximately one-fifth of its downward nail-driving stroke, the cam surface 105 (Fig. 3) engages and closes the normally open switch 106. When switch 106 is closed, circuit 5 (Fig. 16) is closed to energize relay A. Normally open contact A1 in circuit 6 is closed causing the energization of those nail pick solenoids 67 (Figs. 3 and 4) which are associated with the switches 188 being held closed by the effective control pins of the first or uppermost transverse line of pins. As a result certain nail pick gates 44 are locked in position by the plungers of the energized solenoids while the rest of the gates remain free to rotate. As the nailing head continues downwardly, the cam 95 (Fig. 3) engages the bar 57 and shifts it laterally to rotate the unlocked gates 44 which then drop nails into the chucks. Since the nailing punches 39 are already moving downwardly through the lower guide openings of the chucks to drive the nails that were initially dropped into the chucks, the newly selected nails will come to rest against the shank of the punches in position to drop down into the lower guide openings as soon as the punches are lifted out of the openings. After the nailing stroke has been completed, the nailing head 38 is moved upwardly, lifting the punches out of the lower portions of the chucks to permit the newly selected nails to drop into the chucks. When the nail head has completed about four-fifths of its upward movement, the cam surface 105 (Fig. 3) permits the switch 106 to open whereby circuit 5 (Fig. 16) is opened, relay A is de-energized, and contact A1 in circuit 6 is opened de-energizing all the nail pick solenoids 67. During the last one-fifth of the upward movement of the nailing head, the camming surface 107 (Figs. 2 and 3) contacts and closes switch 108. When switch 108 is closed, circuit 3 (Fig. 16) is closed to energize relay B. Normally open contact B1 is closed to lock in relay B, and contact B2 in circuit 4 is closed, energizing solenoid 242 which, as seen in Fig. 9, swings the actuating lever 218 counterclockwise to move the pawl 215 into engagement with one of the teeth of the ratchet bar 210. Then, when the actuating lever 218 is moved upwardly by its eccentric drive mechanism, the bank C will be indexed upwardly a distance sufficient to shift the first line of transverse pins away from the switch actuators 187 and bring the control pins of the second transverse line into engagement with the actuators.

As the bank C is moved upwardly one of the teeth of the ratchet bar cams the lever 253 (Fig. 9) outwardly, moving the holding tooth 252 out of engagement with the ratchet. As soon as the camming tooth is above the holding tooth, the spring 256 swings the holding tooth 252 into position under the camming tooth. As the holding tooth is cammed outwardly, the lever 253 contacts and opens switch 260 whereby circuit 3 (Fig. 16) is opened, and relay B is de-energized. Contact B2 in circuit 4 is opened, and solenoid 242 is de-energized, permitting the spring-loaded push rod 250 (Fig. 9) to swing the actuating lever 218 and the pawl 215 away from lifting engagement with the ratchet bar 210. Since the holding tooth 252 is in engagement with a tooth of the ratchet bar 210, the bank C will be held in the upper indexed position with the switch actuators 187 in contact with the control pins 175 of the second transverse line of pins. It will be understood that the clutch 42 is released automatically or by the operator approximately at the top of the upward stroke of the nailing head so that the article being nailed can be repositioned on the nailing table 22 to receive the next nailing pattern. By successively engaging and disengaging the clutch the operator can complete the hypothetical twenty stroke nailing operation.

During the twentieth stroke of the nailing head, the lowermost transverse line of control pins 175 is in engament with the switch actuators 187. As the nailing head returns upwardly after this twentieth stroke, the bank C is indexed upwardly once more, moving the lowermost transverse line of pins above the switch actuators 187 and bringing control pin 175A into contact with the recycling switch 305 to close this switch. When switch 305 is closed, circuits 1 and 2 are energized, causing the two solenoids 281 to be energized whereby the linkages 270 and 270A (Figs. 12 and 14) are actuated to swing the gibs 128 clockwise to release the ratchet teeth from the holding tooth 252 and to cause one of the gibs to close switch 283 which is connected in circuits 1 and 2 to keep the solenoids 281 energized after switch 305 is released. When the ratchet is disengaged from the holding tooth, the gibs 128 and the banks of control pins mounted thereon slide downwardly against the resistance of the dashpot 285 (Fig. 8). As the unit reaches its lowermost position wherein the uppermost transverse line of control pins is disposed opposite the switch actuators 187, the cam 295 (Fig. 14) engages and opens switch 300. As seen in Fig. 16, switch 300 is connected in circuits 1 and 2 and, accordingly, when it is opened, solenoids 281 are de-energized. As a result, the linkages 270 and 270A are pulled upwardly by the springs 301 and the gibs 128 are swung counterclockwise to return the ratchet bar into engagement with the holding tooth 252. The control pins of the uppermost transverse line of pins are brought into engagement with the switch actuators and the machine is ready for the starting of a new nailing cycle.

When a new operating cycle, which involves different nailing patterns, is to be used it is necessary to clear the chucks of the nails corresponding to the pattern of the first stroke of the old cycle and substitute nails corresponding to the pattern desired for the first stroke of the new cycle. The control pins of the transverse lines are first selectively adjusted to their effective or ineffective positions to set up the new cycle. If the bank C is in its lowered position, it must be indexed upwardly to move the lowermost transverse line of pins into engagement with the switch actuators 187. This upward indexing of the bank is accomplished by means of a jog switch 316 in circuit 3. When switch 316 is closed, relay B is energized, contact B2 in circuit 4 is closed, and solenoid 242 is energized to move the pawl and the ratchet into engagement to cause the upward movement of the bank. Thus, by actuating the jog switch 316 the lowermost transverse line of control pins, which have been positioned to form the nail pattern desired for the first stroke of the new cycle, is moved into engagement with the switch actuators 187. Then, by depressing the foot pedal 43 the nailing head is caused to move downwardly in a nailing operation to drive the undesirable nails from the chucks and cause the nail picks to set up the new pattern for the first stroke of the next cycle.

If a nailing cycle is stopped before it is completed, due to a workpiece being defective or for some similar reason, it is possible to set the machine to begin a new cycle by actuating a jog switch 318 in circuit 1. Closing the jog switch 318 causes the energization of solenoids 281 which, as previously explained, swings the gibs and the control pins mounted thereon away from the holding tooth permitting the bank to move to its lower position.

If a nailing operation is to be carried out involving more than twenty different nail patterns, a stepping switch can be incorporated in the control circuit whereby after the twenty transverse lines of bank C are used, the banks will be lowered and, during the next upward indexing cycle, the transverse lines of bank B or A will be automatically substituted for the lines of bank C. With such a stepping relay, up to sixty different nailing patterns can be provided by the present machine. Alternately, manually actuated switches 325 (Fig. 16) might be used to switch over from one bank of pins to the other. It is, of course, obvious that the capacity of each bank could be increased by adding more units 150 of transverse lines of pins, or additional banks could be added by extending the height of the cabinet.

While the control circuit has been explained in connection with one nailing machine, it will be recognized that banks A, B, and C could simultaneously control the nailing operations of three nailing machines, one bank being associated with each machine.

From the foregoing description, it will be seen that the present invention provides a simple, efficient apparatus for carrying out a nailing cycle in which the nail patterns vary with each nailing stroke. The use of control pins, which may be preset before power is applied to the machine, decreases the possibility of injury to the operator and increases the quality of the article being nailed by making it possible for the operator to concentrate solely on the positioning of the article to be nailed.

Having thus described my invention, what I claim as new and desire to protect by Letters Patent is:

1. A control system for a nailing machine comprising a plurality of electric circuits, each circuit being arranged to effect a control operation upon being closed, a plurality of switches mounted in aligned relation, one switch being electrically connected in each circuit and being arranged upon being closed to partially close the circuit, a plurality of contact pins disposed in transverse lines, each pin being associated with one of said switches and being selectively movable to and from a switch-actuating position, means for indexing said lines of pins to move one line at a time past said switches, whereby the circuits containing switches actuated by contact pins in each line are partially closed at each indexing movement to ready the circuit for performing a control operation, and means connected to said circuits and operative for completing said circuits subsequent to the actuation of said switches by said contact pins.

2. A nailing machine comprising a nailing unit having a reciprocable nailing head and a nail-positioning chuck, a nail pick mounted for movement over a fixed path to deliver a nail to said chuck, an electrically energized locking means associated with said nail pick and arranged upon energization to hold said nail pick in fixed position, an electric circuit for energizing said locking means, a switch in said circuit, and means carried by said nailing head and arranged to contact and close said switch at a predetermined point during the movement of said head to energize said circuit.

3. In a nailing machine having a reciprocating nailing head, a plurality of rotary nail picks, each pick being arranged to oscillate through a fixed range from a nail receiving position to a nail delivery position, an electrically actuated locking unit associated with each nail pick and arranged upon being actuated to lock the pick against movement to nail delivery position, an electric circuit for each locking unit arranged to actuate said unit upon being closed, a plurality of switches mounted in aligned relation, one switch being electrically connected in each circuit and being arranged upon being closed to partially close the circuit, a plurality of contact pins disposed in transverse lines, each pin being associated with one of said switches and being selectively movable to and from a switch-actuating position, means operating in timed relation with said nailing head for indexing said lines of pins to move one line of pins past said switches during each reciprocation of said nailing head, whereby pins of a particular line that are disposed in switch-actuating position will contact associated switches to partially close associated circuits, and means carried by said nailing head and arranged to complete the closing of each partially closed circuit at a subsequent point in the nailing cycle to actuate the locking units in the circuits.

4. A nailing machine comprising a reciprocable nailing head, a plurality of nail-positioning chucks, a nail-pick associated with each chuck and mounted for movement along a fixed path to deliver a nail to the chuck, an electrically energized means for locking each nail pick against movement to nail-delivering position, an electric circuit associated with each locking means and arranged when closed to energize said locking means to lock said nail pick, individual control means connected in each circuit and arranged to be selectively moved to a position partially closing the associated circuit or to a position opening the circuit, a normally open switch in each circuit, and means carried by said nailing head for closing said switch during each nailing stroke of said head to complete the closing of each circuit in which said selective means has been moved to the position partially closing the circuit.

5. A nailing machine comprising a nailing unit having a reciprocable nailing head and a nail-positioning chuck, a nail pick mounted for movement along a fixed path to deliver a nail to said chuck, means defining a recess in said nail pick, a solenoid having a plunger arranged to enter said recess to lock said nail pick against movement, an electric circuit adapted to energize said solenoid, a switch in said circuit arranged to energize said circuit upon being closed, and means carried by said nailing head and arranged to contact and close said switch at a predetermined point during the movement of said head.

6. A nailing machine comprising a nailing unit having a reciprocable nailing head and a plurality of nail-positioning chucks, a nail-pick associated with each chuck and mounted for movement from a nail-selecting positioning to a nail-delivering position, means defining a recess in each nail pick, a solenoid adjacent each nail pick and having a plunger arranged to enter said recess to lock said nail pick against movement, an electric circuit arranged when closed to energize each solenoid, a plurality of switches, one connected in each circuit and arranged to partially close the circuit upon being closed, an actuating member mounted adjacent said nail picks, spring means connecting each nail pick to said actuating member, means for selectively closing predetermined switches to partially close the associated circuits, and means carried by said nailing head for simultaneously completing the closing of all of said partially closed circuits at a predetermined point during the movement of said head.

7. A nailing machine comprising a nailing unit having a nailing head and a plurality of nail-positioning chucks, a rotary nail pick associated with each chuck for delivering a nail thereto, means defining a recess in each nail pick, a solenoid associated with each nail pick and having a plunger arranged upon energization of said solenoid to enter the recess and lock the nail pick against movement to nail-delivering position, means for selectively energizing said solenoids, an actuating member mounted for reciprocating movement adjacent said nail picks, and a torsion spring connected between each of said nail picks and said actuating member, each torsion spring being arranged to transmit movement of said actuating member to the associated nail pick when said solenoid plunger is removed from the recess and arranged to absorb the movement of said actuating member when said solenoid plunger is in locking engagement in the recess.

8. In a nailing machine having an inclined nail run, a nail feeding device comprising a generally circular nail pick mounted for oscillation adjacent the lower end of the nail run, said pick having a pair of spaced peripheral slots, one of said slots being adapted to register with said nail run to receive a nail therefrom, and a locking member movable into the other of said slots when said one slot is in nail-receiving position, whereby to lock said nail pick against movement to nail discharge position.

9. In a nailing machine the combination of a nail-positioning chuck, a nail pick mounted adjacent the entrance of said chuck and having a rotatable gate with a pair of diametrically opposed peripheral slots, nail supply means arranged to deliver a nail to one of said slots, a plunger mounted for movement into the other of said slots, means for moving said plunger into said other slot to lock said gate against rotation, and means for rotating said gate between nail receiving position and nail discharge position when said plunger is removed from said other slot.

10. A nailing machine comprising a nailing unit having a reciprocable nailing head and a nail-positioning chuck, a nail pick mounted for movement over a fixed path to deliver a nail to said chuck, an electrically energized locking means effective when energized to hold said nail pick in fixed position, an electric circuit adapted when closed to energize said locking means, a switch connected in said circuit and arranged to energize said circuit when said switch is closed, means mounting said switch in fixed position, a support member mounted for vertical reciprocating movement adjacent said switch, a control pin pivotally mounted on said support member for movement between a position in vertical alignment with said switch to a position out of alignment with said switch, means operatively connected between said nailing head and said support member for moving said support member to bring said control pin into contact with said switch to close said switch and partially close said circuit, and means connected to said circuit and operative for completing said circuit subsequent to the activation of said switches by said contact pins.

11. A nailing machine comprising a nailing unit having a reciprocable nailing head and a nail-positioning chuck, a nail pick mounted for movement over a fixed path to deliver a nail to said chuck, an electrically energized locking means effective upon energization to hold said nail pick in fixed position, an electric circuit arranged to energize said locking means upon being closed, a first and a second switch connected in said circuit and arranged to close said circuit when both switches are closed, a control member mounted for movement toward and away from said first switch, a contact pin pivotally mounted on said control member for movement to and from a position of alignment with said switch, and means operatively connected between said reciprocable nailing head and said control member for bodily moving said control member a distance sufficient to move said pin into contact with said first switch to close said switch when said switch and said contact pin are in aligned position, and means carried by said nailing head for closing said second switch upon said nailing head reaching a subsequent position in its cycle.

12. In combination, a nailing machine having a nailing head, a plurality of nail-positioning chucks, a nail-pick arranged to deliver nails to each chuck, electrically-actuated means for locking each nail pick against movement to nail-delivering position, an electric circuit associated with each locking means and arranged upon being closed to move said locking means to nail-pick locking position, a switch in each circuit arranged upon being closed to energize the circuit, a member arranged to support said switches in fixed position, a control member mounted for vertical movement relative to said switches, a plurality of pins mounted in vertical rows on said control member, each vertical row being associated with one of said switches and each pin in each row being movable on said control member to and from a position in vertical alignment with the associated switch and being arranged when in aligned position to contact and close said switch upon being brought into horizontal registry therewith, and means for moving said control member a predetermined distance in a vertical direction to move each pin in said aligned position into said horizontal position and into contact with the associated switch to close the switch.

13. In a nailing machine the combination of a plurality of nail-positioning chucks, a nail pick associated with each chuck and adapted to move along a fixed path to deliver nails to said chuck, electrically actuated means for locking each nail pick to prevent said nail-delivering movement, an electric circuit electrically connected to each locking means and arranged upon being closed to hold said locking means in nail-pick locking position, a switch connected in said circuit and arranged when closed to close said circuit, support means mounting said switch in fixed position, a carrier mounted for movement on said support means upwardly toward said switch, a plurality of control pins mounted on said carrier in equally spaced relation in a vertical row, each pin being selectively movable on said carrier to and from a position in vertical alignment with said switch and being arranged when in aligned position to contact and close said switch upon being brought into horizontal registry therewith, and means for moving said carrier upwardly in successive increments equal to the spacing between pins on said carrier to successively move each pin into horizontal alignment with said switch.

14. In a nailing machine, a reciprocable nailing head, a nail-positioning chuck, a nail pick mounted for movement along a fixed path to deliver nails one at a time to said nail chuck, an electrically actuated means for locking said nail pick in fixed position, an electric circuit electrically connected to said actuating means and arranged when closed to move said locking means to locking position, a switch connected in said circuit, a support mounting said switch in fixed position, a carrier mounted for vertical movement on said support, a plurality of control pins mounted on said carrier in vertically spaced relation and in a vertical row, each pin being selectively movable on said carrier to vertical alignment with said switch to position said pin to contact and close said switch upon reaching horizontal alignment therewith, a ratchet mounted on said carrier, a pawl mounted on said support for reciprocating movement in a generally vertical direction and for pivotal movement toward and away from said ratchet, and means operatively connected between said nailing head and said pawl for moving said pawl into engagement with said ratchet during each reciprocation of said head to successively elevate said control pins into horizontal alignment with said switch, whereby each pin in vertical alignment with said switch will actuate and close said switch.

15. In a nailing machine, a nailing unit having a reciprocable nailing head and a nail-positioning chuck, a nail pick mounted for movement over a fixed range to deliver a nail to said chuck, an electrically actuated locking means effective when energized to lock said nail pick against nail-delivering movement, a first electric circuit for energizing said electrically actuated means, a switch connected in said first circuit and arranged when moved to closed position to close said circuit, a support member mounting said switch in fixed position, a carrier mounted for vertical movement past said switch, a plurality of vertically spaced contact pins mounted on said carrier in a vertical row, each pin being movable to a position to contact and close said switch upon being moved into horizontal registry therewith or to a position in which it will not contact said switch, a ratchet mounted on said carrier, a pawl mounted on said support member for reciprocation in a generally vertical direction and for pivotal movement toward and away from said ratchet, a latch pivotally mounted on said support member, spring means urging said latch into engagement with said ratchet to retain said member in elevated position, an electrically actuated linkage arranged upon energization to move said pawl into engagement with said ratchet to elevate said ratchet and to cam said latch out of engagement with said ratchet, a second electrical circuit for energizing said linkage, a normally open switch connected in said second circuit and positioned to be contacted by said nailing head during each nailing stroke to close said normally open switch to energize said linkage and move said pawl into engagement with said ratchet, and a normally closed switch connected in said second circuit and positioned to be contacted by said latch each time said latch is cammed out of engagement with said ratchet whereby to open said normally closed switch and de-energize said second circuit.

16. In a nailing machine having a nailing head, a plurality of nail-positioning chucks, a nail pick arranged to deliver a nail to each chuck, an electrically actuated locking means arranged when energized to lock each nail pick against nail delivering movement, an electric circuit associated with the locking means of each nail pick and arranged to energize said locking means when the circuit is closed, a switch in said circuit adapted to be moved to closed position to close said circuit and energize said locking means, a support mounting said switches in fixed horizontal alignment, a carrier mounted on said support for vertical movement relative to said switches and for pivoting movement toward and away from said switches, a plurality of control pins mounted on said carrier in vertically spaced relation and in vertical rows, each row being associated with one of said switches and each pin being selectively movable on said carrier to vertical alignment with the associated switch to position said pin to contact and close said switch upon reaching horizontal alignment therewith, a ratchet secured to said carrier, a latch pivotally mounted on said support, spring means urging said latch into engagement with said ratchet to support said ratchet, a pawl mounted on said support for reciprocating movement in a generally vertical direction and for pivotal movement toward and away from said ratchet, control means operatively connected between said pawl and said nailing head for pivoting said pawl into engagement with said ratchet near the end of each stroke of said nailing head to effect successive upward indexing movement of said carrier to successively move each control pin in each row on said carrier into horizontal alignment with said switch, an electrically actuated linkage connected to said carrier and arranged upon actuation to swing said carrier away from said latch, and electric control means operatively connected between said linkage and said carrier for actuating said linkage to swing said carrier away from said latch when the lowermost control pin on said carrier is indexed to a position above said switch.

17. In a nailing machine the combination of a plurality of nail-positioning chucks, a nail pick associated with each chuck and adapted to move along a fixed path to deliver a nail to its associated chuck, means for individually locking each nail pick to prevent the nail-delivering movement, and means associated with said locking means for selectively locking certain of said nail picks.

18. In a nailing machine the combination of a plurality of nail positioning chucks, a nail pick associated with each chuck and adapted to move along a fixed path to deliver a nail to its associated chuck, electromagnetic locking means for individually locking each nail pick to prevent the nail delivery movement, and a circuit connected to said locking means for selectively operating certain of said locking means to prevent the nail delivery movement of predetermined picks.

19. A control system for a nailing machine comprising a plurality of electrical circuits, each circuit being arranged to effect a control operation upon being closed, a plurality of switches mounted in aligned relation, one switch being electrically connected in each circuit and being arranged upon being closed to partially close the circuit, a plurality of contact pins disposed in transverse lines, each pin being associated with one of said switches and being selectively movable to and from a switch-actuating position, means for pivotally mounting said pins, means including a pawl and ratchet for indexing said lines of pins to move one line at a time past said switches, whereby the circuits containing switches actuated by contact pins in each line are partially closed at each indexing movement to prepare the circuit for performing a control operation, and means connected to said circuits and operative for completing said circuits subsequent to the actuation of said switches by said contact pins.

20. A control system for a nailing machine comprising a plurality of electrical circuits, each circuit being arranged to effect a control operation, a plurality of switches disposed in aligned relation, one switch being electrically connected in each circuit, a support member mounting said aligned switches in a fixed position, a carrier mounted for movement on said support member, a plurality of control pins pivotally mounted on said carrier in lines, each pin being associated with one of said switches and being selectively movable on said carrier to a position wherein said pin is arranged to contact and close its associated switch upon reaching alignment therewith, a ratchet mounted on said carrier, a pawl mounted on said support member for reciprocating movement and for pivotal movement toward and away from said ratchet, and means including a solenoid for intermittently moving said pawl into engagement with said ratchet to successively move said lines of control pins into alignment with said switches.

21. A control system for a nailing machine comprising a plurality of electrical circuits, each circuit being arranged to effect a control operation, a plurality of switches mounted in aligned relation, one switch being electrically connected in each circuit, a support member mounting said aligned switches in a fixed position, a carrier mounted for movement on said support member, a plurality of control pins pivotally mounted on said carrier in lines, each pin being associated with one of said switches and being selectively movable on said carrier to a position wherein said pin is arranged to contact and close its associated switch upon reaching alignment therewith, a ratchet mounted on said carrier, a pawl mounted on said support member for reciprocating movement and for pivotal movement toward and away from said ratchet, means including a solenoid for intermittently moving said pawl into engagement with said ratchet to successively move said lines of control pins into alignment with said switches, and means including a solenoid to swing said pawl away from said ratchet for lowering said lines of pins upon said carrier being successively moved a predetermined amount.

22. A nailing machine comprising a plurality of nail positioning chucks, a rotary nail pick associated with each chuck for delivering a nail thereto, means for selectively locking said nail picks against movement to nail-delivering position, a reciprocating member mounted for movement adjacent said nail picks, and a torsion spring connected between each nail pick and said reciprocating member, each torsion spring being arranged to transmit movement of said reciprocating member to the associated nail pick when said associated pick is unlocked and arranged to absorb the movement of said reciprocating member when said associated nail pick is locked.

23. In a nailing machine, a nail run, a nail pick mounted for oscillation adjacent the lower end of the nail run and having a rotatable gate with a plurality of peripheral slots, said slots being of different sizes to accommodate different size nails, and means for rotating said gate to move one of said slots in alignment with said nail run for receiving a nail.

24. In a nailing machine, a nail-positioning chuck, a nail pick mounted for movement along a fixed path to deliver nails one at a time to said nail chuck, an electrically actuated means for controlling said nail pick, an electrical circuit operatively connected to said actuating means, a switch connected in said circuit, a support mounting said switch in fixed position, a carrier mounted for vertical movement on said support, a plurality of control pins mounted on said carrier in vertically spaced relation and in a vertical row, each pin being selectively movable on said carrier to vertical alignment with said switch to position said pin to contact said switch upon reaching alignment therewith, and means for moving said carrier upwardly in successive increments equal to the spacing between pins on said carrier to successively elevate said control pins into horizontal alignment with said switch.

References Cited in the file of this patent

UNITED STATES PATENTS

| | | |
|---|---|---|
| 2,023,570 | Bahr | Dec. 10, 1935 |
| 2,688,438 | Breese | Sept. 7, 1954 |